(No Model.)

J. N. HOLEM.
TONGUE SUPPORT FOR VEHICLES.

No. 259,152. Patented June 6, 1882.

Attest:
F. H. Schott
A. R. Brown

Inventor:
J. N. Holem
per J. O. Tasker
atty

UNITED STATES PATENT OFFICE.

JONATHAN N. HOLEM, OF PLYMOUTH, INDIANA.

TONGUE-SUPPORT FOR VEHICLES.

SPECIFICATION forming part of Letters Patent No. 259,152, dated June 6, 1882.

Application filed March 9, 1882. (No model.)

*To all whom it may concern:*

Be it known that I, JONATHAN N. HOLEM, a citizen of the United States of America, residing at Plymouth, in the county of Marshall and State of Indiana, have invented certain new and useful Improvements in Tongue-Rests for Vehicles, Machines, &c., of which the following is a specification.

My invention relates to a tongue-support for vehicles or machines; and the object of my invention is to provide a device, controlled by the driver, for supporting the tongue of a vehicle or machine, particularly adapted for use on harvesting machinery—reapers, mowers, binders, &c.—to relieve the necks of the horses of the weight which comes thereon when the machine is stopped and the driver dismounts.

To this end my invention consists in an adjustable support hinged to the tongue of a vehicle or machine and connected to a hand-lever in reach of the driver, by a chain or its equivalent, in such a manner that it may be folded up to the tongue or lowered to support the same by the driver without leaving his seat.

Figure 1:
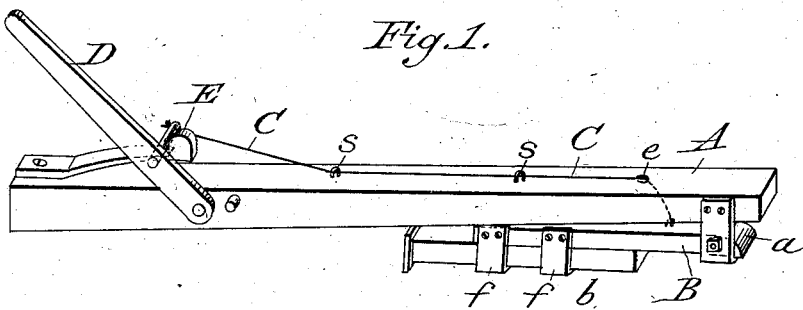
Figure 2:
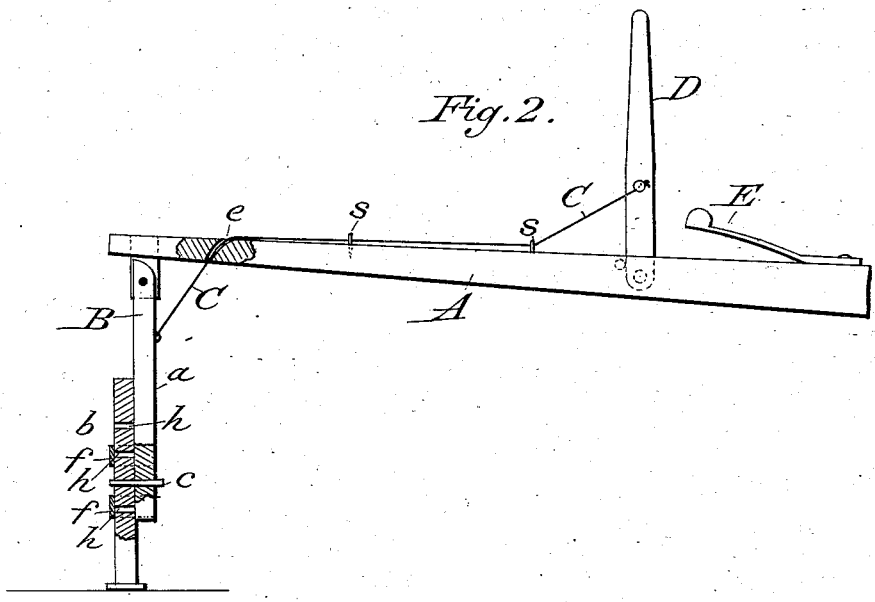

In the accompanying drawings, which form a part of this specification, Figure 1 is a perspective view, showing my improved tongue-support attached to the tongue of a vehicle or machine. Fig. 2 is a partial sectional view of the same.

Like parts are represented by similar letters of reference throughout the different views.

A represents the tongue of a vehicle or machine, to which is hinged at any convenient point an adjustable support, B.

Connected to the support B is a chain, or its equivalent, C, which passes through an opening, e, in tongue A, and extending through staple s s is attached at its other end to a hand-lever, D. E is a snap-catch, referred to hereinafter.

The operation is very simple. When the machine or vehicle is started the driver takes hold of the hand-lever D and draws it back until the snap-catch E engages with the pin d in lever D. This brings the support up, as shown in Fig. 1, where it is held by means of the snap-catch E while the machine or vehicle is in motion. When the machine is stopped the driver presses the spring-catch E with his foot, which releases the lever D, and the support B drops down, as shown in the drawings, and forms a support for the tongue A.

The support B may be made in two parts, a and b, the part b of which is arranged to slide up or down through the loops f f, secured in part a, and provided with a series of holes, h, to receive a pin, c, which passes through the part a, and thus provides for the longitudinal adjustment of said support B.

The support B may be hinged to the tongue A in any desired manner, and the hand-lever D placed at any convenient point in reach of the driver.

Having thus described my invention, what I claim as new, and desire to secure by Letters Patent, is—

1. The combination of the tongue A, support B, hinged thereto, lever D, having pin d, chain C, connecting said lever and support, and the snap-catch E, for holding the lever back, substantially as described.

2. The combination, with the tongue A, of the adjustable support B, composed of the parts a b, connected substantially as and for the purpose described.

In testimony whereof I affix my signature in presence of two witnesses.

JONATHAN N. HOLEM.

Witnesses:
ORLANDO M. PACKARD,
NATHAN YEARICK.